United States Patent [19]

Zeitsch

[11] Patent Number: 4,666,564
[45] Date of Patent: May 19, 1987

[54] METHOD OF AND APPARATUS FOR DISTILLING A NONAZEOTROPIC LIQUID MIXTURE

[75] Inventor: Karl Zeitsch, Cologne, Fed. Rep. of Germany

[73] Assignee: Fried. Krupp Gesellschaft mit beschrankter Haftung, Essen, Fed. Rep. of Germany

[21] Appl. No.: 720,096

[22] Filed: Apr. 5, 1985

[30] Foreign Application Priority Data

Apr. 21, 1984 [DE] Fed. Rep. of Germany ....... 3415236

[51] Int. Cl.$^4$ .............................................. B01D 3/08
[52] U.S. Cl. ................... 203/100; 202/158; 202/235; 202/238; 159/11.1; 159/43.1; 159/47.1; 159/DIG. 27; 159/DIG. 28; 261/83
[58] Field of Search ................. 203/100, 86; 202/235, 202/238, 158, 267 R; 159/6.1, 28.1, 11.1, 43.1, DIG. 28, DIG. 27, 47.1, 23, DIG. 32; 165/92; 261/83, 75

[56] References Cited

U.S. PATENT DOCUMENTS

| 2,220,171 | 11/1940 | Noaillon | 202/238 |
|---|---|---|---|
| 2,484,445 | 10/1949 | Bibby | 202/238 |
| 3,200,051 | 8/1965 | Silvern | 202/238 |
| 3,255,805 | 6/1966 | Bechard | 202/238 |
| 3,347,754 | 10/1967 | Thomas | 202/238 |
| 3,385,769 | 5/1968 | Brose | 159/DIG. 27 |
| 3,640,330 | 2/1972 | Javet | 202/238 |
| 3,725,209 | 4/1973 | Rosa | 202/238 |
| 3,896,004 | 7/1975 | Rodgers | 159/DIG. 27 |
| 3,923,097 | 12/1975 | Hovad | 165/92 |
| 4,529,478 | 7/1985 | Mehta et al. | 159/11.1 |

FOREIGN PATENT DOCUMENTS

| 2200905 | 7/1973 | Fed. Rep. of Germany | 202/238 |
|---|---|---|---|
| 0053695 | 4/1980 | Japan | 165/92 |

Primary Examiner—S. Leon Bashore
Assistant Examiner—V. Manoharan
Attorney, Agent, or Firm—Karl F. Ross; Herbert Dubno

[57] ABSTRACT

Method and apparatus for distilling a liquid mixture to separate a volatile vapor fraction therefrom. The liquid is forced to flow along a meander-like path through a plurality of concentrically arranged chambers of a rotating drum. In the radially outermost chamber, a heating unit is provided which brings the liquid to a boiling temperature to allow formation of vapor. The liquid thus freed of volatile constituents is then discharged from the outermost chamber in which the liquid is subjected to a maximum centrifugal acceleration while the vapor moves radially inwardly under the action of the centripetal force to the innermost chamber from where the vapor containing volatile constituents is discharged.

17 Claims, 3 Drawing Figures

METHOD OF AND APPARATUS FOR DISTILLING A NONAZEOTROPIC LIQUID MIXTURE

FIELD OF THE INVENTION

My present invention relates to a method of and to an apparatus for distilling a nonazeotropic liquid mixture to separate the latter into a vapor fraction of highly volatile constituents and into a liquid mixture essentially depleted of these highly volatile constituents.

BACKGROUND OF THE INVENTION

Methods and apparatus for distilling a liquid mixture, generally make use of tower-like columns. It is, however, also known to use stripper columns in the form of cylindrical towers in which the liquid mixture to be separated is introduced through the top portion and flows downwardly while vapor generated at the bottom ascends in countercurrent flow. Stripper columns are in general designed as plate columns in which horizontal plates or trays are used to provide the exchange of constituents between the liquid and the vapor fraction, or as packed columns which use packings to provide the exchange of constituents (material exchange) by bringing the liquid and the vapor into intimate contact with each other.

These known columns have the drawback that they must be of considerable height since the separation of liquid and vapor depends largely on the action of gravity.

Two conditions must be taken into account in dealing with a plate or tray column. First, the flow of the liquid over the horizontal plates is obtained by the liquid pressure build-up which is provided through the laterally arranged weir of the column and the magnitude of the pressure build-up is proportional to the height of the liquid column and the effective acceleration due to gravity.

Second, the liquid droplets which are upwardly expelled from the liquid boiling over the plate should not be entrained by the ascending vapor to the next upper plate. It is obvious that the maximum vapor speed to realize this is proportional to the vertically downwardly directed acceleration and increases correspondingly with the acceleration. Thus, both conditions necessitate a substantial height for such stripper columns.

It should now also be apparent that stripper columns of given output can be smaller if the effective acceleration is greater.

In practice, moreover, it has been found that conventional stripper columns do not operate satisfactorily under conditions of excessive formation of foam. Likewise, there may be occasions e.g. upon high pressure that the density of the vapor is almost the same as the density of liquid so that a separation of the two phases is difficult in stripper columns whose effectiveness is based on gravity.

OBJECTS OF THE INVENTION

It is thus the principal object of my present invention to provide a method of and an apparatus for distilling a liquid mixture obviating the afore-stated drawbacks.

A more specific object is to provide a distillation apparatus and method which is effective in the presence of foaming and where the density difference between the two phases to be separated is small.

Another object is to provide a system which allows the apparatus to be relatively small.

SUMMARY OF THE INVENTION

I realize these objects, according to the invention, by introducing the liquid into a rotatable drum whose interior is subdivided by respective partition walls in concentrical chambers so that the liquid is subjected to an increasing centrifugal force during rotation of the drum and is moved radially outwardly until entering the outermost chamber in which a heating unit is arranged to allow formation of vapor bubbles in this area.

Under centripetal force acting in radial direction, the vapor bubbles are moved inwardly through permeable sections of the partition walls towards the innermost chamber located around the center of rotation so that the liquid depleted of volatile constituents is discharged from the outermost chamber i.e. at an area of maximum diameter of the drum while the vapor fraction containing volatile constituents exits from the innermost chamber.

According to another feature of my invention, the partition walls are arranged within the interior in such a manner that a meander-shaped path for the liquid is defined when flowing through the individual chambers.

Such a distillating apparatus can be designed with relatively low height and overall small size because its effectiveness does not depend on the acceleration due to gravity but is based on centrifugal forces or centrifugal acceleration, respectively, obtained through rotation of the drum.

The idle space which was necessary in known stripper columns and could amount to 95% is thus omitted.

Therefore, the distilling apparatus according to the invention can be employed at locations which render the use of high columns impossible as e.g. on ships or in underground chambers.

A further advantage of the present invention is that even if there are only slight differences between the density of the vapor and the liquid, the effectiveness of the distilling apparatus will not be affected. Moreover, a formation of foam does also not negatively influence its operativeness.

According to a further feature of the invention, the heating unit as provided in the outermost chamber includes a ferromagnetic ring which cooperates with a stationary induction coil so as to allow the heating during rotation of the drum. Such an induction coil can be supplied with inexpensive line current frequency.

The invention also comprises a method of distilling a liquid mixture containing a highly volatile component, comprising the steps of centrifugally displacing said mixture outwardly while inducing said mixture to move in a meandering path in alternately opposite directions parallel to an axis; heating said mixture as said mixture reaches an outermost location with respect to said axis to generate bubbles of said component; centripetally driving said bubbles radially inwardly through the mixture flowing parallel to said axis thereby forming an inwardly moving low density phase, the mixture at said outermost location forming a high-density phase; and separately collecting said phases.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
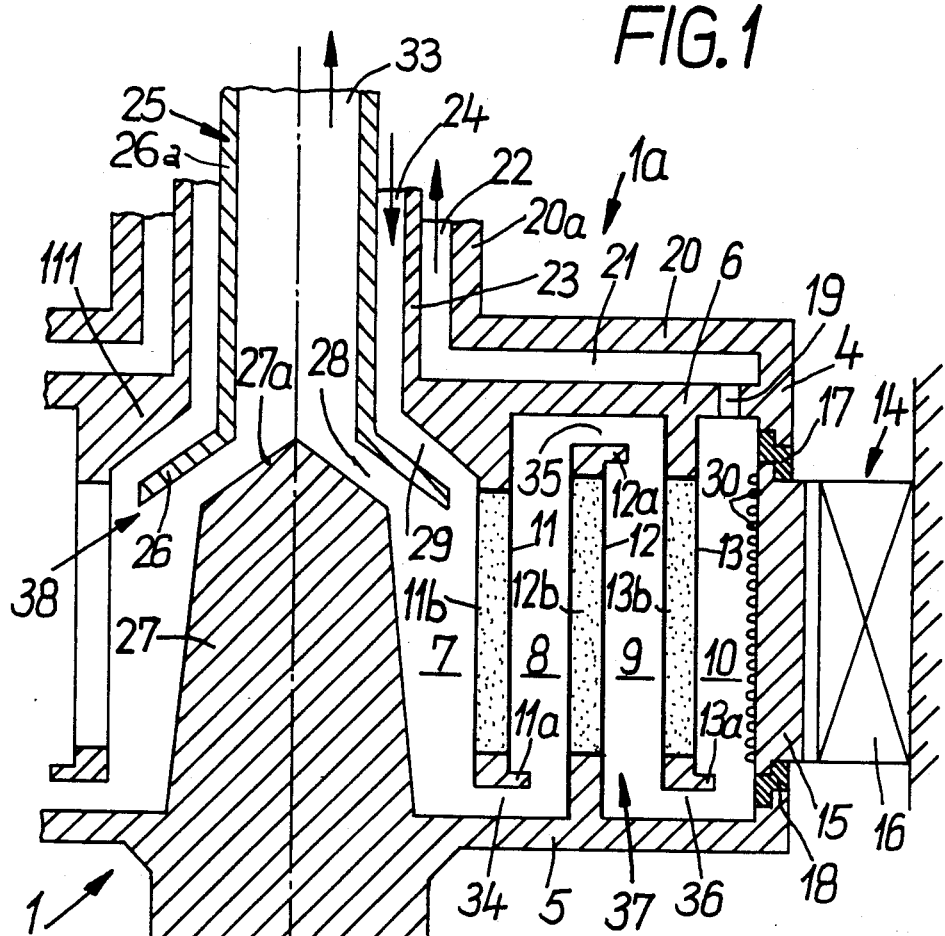
FIG. 1 is a sectional view of an apparatus according to the invention.

In FIG. 1, there is shown a distilling apparatus generally designated by reference numeral 1 and including a rotatable drum 1a. The drum 1a includes an outer jacket 4 whose tray portion 5 is supported on a shaft 2 so that the rotation of the shaft 2 about axis 2a is transmitted to the drum 1a. At a suitable location, the shaft 2 is supported by a bearing 3, and is driven by a drive mechanism (not shown). Extending parallel to the tray 5 at an axial distance thereto is a lid 6 whose one end is integrally connected to a cylindrical wall 23 arranged perpendicularly to the lid 6.

The tray 5 is integrally connected with a central block 27 which extends in axial direction in the center of the drum 1a and is of obelisk-like shape so as to be tapered towards its top 27a. Defined in axial direction by the tray 5 and the lid 6 and in radial direction by the central block 27 and the jacket 4 is an internal annular space 37 which is subdivided into individual chambers 7, 8, 9, 10 by respective partition walls 11, 12, 13. The chambers 7, 8, 9, 10 are arranged concentrically around the rotational axis 2a. Although only four chambers are shown in the present embodiment, I may note that any arbitrary number of chambers is conceivable.

The partitions 11 and 13 are integrally connected to the lid 6 while extending with their respective free end at an axial distance to the tray 5 to provide junctions 34, 36, between adjacent chambers 7 and 8 as well as 9 and 10. In a similar manner, the partition 12 is integrally connected with the tray 5 while its free ends extends at an axial distance to the lid 6 to define junction 35 which allows communication between chambers 8 and 9. Consequently, the liquid flows along a meander-shaped path through the individual chambers 7, 8, 9, 10.

Each of the partition walls 11, 12, 13 is provided at its free end with a non-permeable flange or ridge 11a, 12a, 13a which projects radially outwardly and has a width corresponding essentially to half the width of the associated chamber 8, 9, 10, the ridge 11a, 12a, 13a corresponding to a weir or labyrinth.

Embracing the radially outermost chamber 10 is a heating unit which is generally characterized by reference number 14. The heating unit 14 includes a ferromagnetic ring 15 which is accommodated within the jacket 4 along a portion opposing the partition wall 13 and is plated at least at its surface facing the chamber 10 with a corrosion-resistant coating for protection against an electrolytic attack. At the upper and lower extremities of the ring 15, thermal insulators 17, 18 are respectively provided to insulate the ring 15 against the jacket 4. The ring 15 further cooperates with a stationary induction coil 16 which can be supplied with inexpensive line current frequency.

The jacket 4 is further integrally connected to one end of a cover 20 which extends parallel to but at a distance from the lid 6 so that a radial channel 21 is defined therebetween. The other end of the cover 20 is connected to a nipple 20a which extends parallel to the cylindrical wall 23 at a radial distance thereto so as to define a channel 22 which extends in axial direction in prolongation of the channel 21. A communication between the channel 21 and the outermost chamber 10 is obtained by a through-passage 19 provided in lid 6.

As is shown in FIG. 1, the partition wall 11 which is adjacent to the central block 27 has an upper portion 111 which widens towards its connection with the lid 6 so that a passage 38 is defined between the top section 27a of the central block 27 and the upper portion 111. Arranged within the cylindrical wall 23 is a connection piece 25 which includes a cylindrical portion 26a and a conical end portion or collar 26. The cylindrical portion 26a defined a central outlet duct 33 and extends at a distance to the surrounding wall 23 so that a ring channel 24 is provided therebetween. The conical collar 26 projects into the passage 38 to divide the latter into a channel 28 which is in elongation of the outlet channel 33 and into a channel 29 which communicates with the channel 24. As will be described hereinafter, liquid is introduced through channels 24 and 29 while the volatile vapor fraction is discharged through the channel 28 and outlet duct 33.

Figure 3:
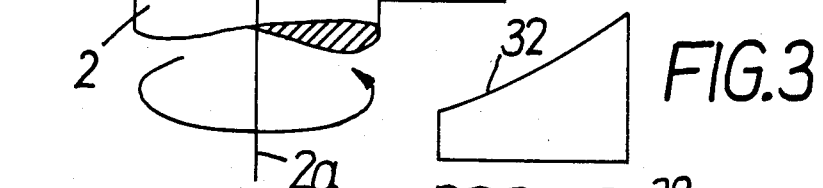
FIG. 3 is a graphical illustration of the pressure within the permeable section.
Figure 2:
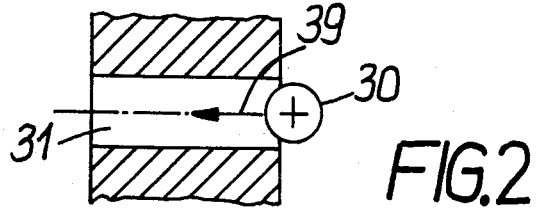
FIG. 2 is a partial sectional view through a permeable section of a partition wall of the apparatus according to FIG. 1.

As indicated by crosshatching, each partition wall 11, 12, 13 is provided with a permeable or porous section 11b, 12b, 13b through which vapor bubbles can penetrate. The sections 11b, 12b, 13b of the partition walls 11, 12, 13 can be made of sintered material or of a closely perforated material. In FIG. 2, one such pore 31 for example from the section 11b of the partition wall 11 is illustrated. At the right hand side of the pore 31, a vapor bubble 30 is shown which is about to enter the pore 31 and then flows in direction of arrow 39 therethrough i.e. from one chamber e.g. chamber 8 into the adjacent chamber 7. In FIG. 3, the influence of the centripetal force is illustrated as caused by the rotation and thus shows the pressure graph 32 for a vapor bubble 30 passing through a pore 31.

After bringing the drum 1a into rotation, the liquid to be separated from its volatile fraction is introduced through channels 24 and 29 into the chamber 7. Due to the rotation, the liquid is under the influence of a centrifugal force and is increasingly accelerated in radial direction. Thus, the liquid flows via junction 34 into chamber 8, via junction 35 into chamber 9 and thereafter via junction 36 into the outermost chamber 10 in which the liquid is subjected to a maximum centrifugal acceleration. When reaching the chamber 10, the liquid flows past the ferromagnetic ring 15 which is heated during rotation of the drum 1a by the induction coil 16 to a predetermined temperature. The ferromagnetic ring 15 acts as a heating plate which is considerably hotter than the surrounding portions and causes the passing liquid to boil. This in turn results in the formation of vapor bubbles 30 along the innerside of the ring 15.

While the liquid depleted of volatile constituents is discharged through passage 19, i.e. at a location at which the internal space 37 of the drum 1a has its maximum diameter, into the radial channel 21 and axial channel 22, the vapor bubbles 30 are subjected to a centripetal force because of the rotation of the drum 1a and there is thus a radial pressure increase to move the bubbles 30 in centripetal direction towards the axis 2a. Due to the permeability of the partitions 11, 12, 13, the vapor bubbles 30 can penetrate through respective pores 31, as schematically illustrated in FIG. 2 and thus pass successively the partition walls 11, 12, 13 until reaching the tapered surface of the central block 27 at which point, the bubbles 30 are moved upwardly and finally are discharged via channel 28 through outlet channel 33.

If no vapor bubbles 30 are produced by heating unit 14, the pores 31 are filled with liquid.

Through the collar 26, the rising bubbles 30 are prevented from entering into channel 29 so that a separation of the introduced liquid from the discharged vapor is obtained. The flanges 11a, 12a, 13a prevent the vapor bubbles 30 from passing through the junctions 34, 35, 36 and thus around the partitions 11, 12, 13.

Upon introduction of a nonazeotropic liquid mixture through channel 24, the obtained vapor is richer in the highly volatile components than the original liquid from which the vapor is generated. This would also be true even if the space 37 was not subdivided into individual chambers; however, the meander-shaped guidance of the liquid around the partitions 11, 12, 13 enhances the differences in the concentration because the liquid is repeatedly brought into contact with the vapor analogously to the operation of a tray column thus being more depleted in volatile constituents than would be the case in the equilibrium. Consequently, volatile constituents are transferred from the liquid to the vapor. This means that the liquid is increasingly devolatilized as would be the case in conventional stripper columns. In contrast thereto, however, the heating unit as used in the distilling apparatus 1 also contributes to a change of concentration because the liquid reaching the outer zone will be additionally depleted of volatile constituents during its flow over the heating surface of the ferromagnetic ring 15.

I claim:

1. A method of distilling a nonazeotropic liquid mixture, comprising the steps of:
    introducing the liquid mixture into a drum defining a vertical axis;
    rotating the drum about the axis so that the liquid mixture is subjected to centrifugal acceleration said liquid mixture moving along a meander-shaped path alternately upwardly and downwardly in radially outward direction;
    heating the liquid mixture at an outermost area of the drum in which the liquid mixture is subjected to a maximum centrifugal acceleration to allow formation of vapor bubbles in said area; and
    allowing the vapor bubbles to move radially inwardly through permeable sections of walls defining said meander-shaped path under the action of a centripetal force towards the axis of rotation whereby a volatile fraction is entrained inwardly by said vapor bubbles.

2. A method as defined in claim 1, further comprising the step of discharging the liquid mixture after it has been subjected to said heating step.

3. A method as defined in claim 1, further comprising the step of discharging the volatile fraction from the center of the drum substantially along the axis of rotation.

4. A method as defined in claim 1 wherein said heating step includes using an induction means to obtain boiling of the liquid mixture.

5. A method as defined in claim 4 wherein said heating step uses line-current frequency to operate said induction means.

6. Apparatus for distilling a nonazeotropic liquid mixture, comprising:
    a drum rotatable about an axis and defining an interior;
    partition means for dividing said interior into a plurality of chambers connected to each other and concentrically arranged about said axis in radial direction, said partition means including partition walls each of which having a permeable section;
    heating means connected to a radially outermost one of said chambers for allowing a formation of vapor in said chamber by heating the liquid mixture, so that upon rotation of said drum the liquid is moved through said chambers radially outwardly to said outermost chamber wherein the vapor provided by passing the liquid along said heating means is moved radially inwardly through said permeable section of each of said partition walls to a radially innermost one of said chambers;
    first outlet means connected to said outermost chamber for discharging the liquid; and
    second outlet means connected to said innermost chamber for discharging the vapor, said chambers being connected to each other in a meander-shaped path axially along said walls.

7. An apparatus as defined in claim 6 wherein said drum includes a jacket, said outermost chamber having an outer wall constituted by said jacket, said heating means including a heating ring which is arranged within said jacket.

8. An apparatus as defined in claim 6 wherein each of said partition walls includes a non-permeable flange to prevent the vapor to flow around said partition walls into the adjacent one of said chambers.

9. An apparatus as defined in claim 8 wherein each of said chambers has a width, each of said flanges having a width corresponding to half the width of said chambers.

10. An apparatus as defined in claim 7 wherein said heating ring is made of ferromagnetic material, said heating means further including a stationary inductance coil connected to said ring to heat the said ring to a predetermined temperature.

11. An apparatus as defined in claim 7, further comprising thermal insulation between said heating ring and said jacket.

12. An apparatus as defined in claim 7 wherein said ring has an inner side facing said outermost chamber, said inner side being plated with a corrosion-resistant coating.

13. An apparatus as defined in claim 6 wherein said permeable section of said partition walls is made of sintered material.

14. An apparatus as defined in claim 6 wherein said permeable section of said partition walls is made of perforated material.

15. An apparatus as defined in claim 6 wherein said first outlet means includes a cover portion connected to said drum defining a radial channel which is connected to the outermost chamber through a passage means, a nipple connected to said cover portion and extending perpendicularly thereto in axial direction, and a cylindrical wall extending in axial direction and connected to said drum so that between said nipple and said cylindrical wall an axial channel is defined which extends in elongation of said radial channel.

16. An apparatus as defined in claim 15 wherein said second outlet means includes a connection piece extending within said cylindrical wall at a distance thereto and defining an outlet duct connected to an innermost chamber.

17. An apparatus as defined in claim 16 wherein said connecting piece has a lower end provided with a conically-shaped collar to guide the vapor into said outlet duct.

* * * * *

UNITED STATES PATENT AND TRADEMARK OFFICE
CERTIFICATE OF CORRECTION

PATENT NO. : 4,666,564
DATED : 19 May 1987
INVENTOR(S) : Karl ZEITSCH

It is certified that error appears in the above-identified patent and that said Letters Patent is hereby corrected as shown below:

On the Title Page:

In the heading, Left column, change item [54] to read

-- METHOD OF AND APPARATUS FOR DISTILLING A NONAZEOTROPIC LIQUID MIXTURE --

In column 1, the title should read:

-- METHOD OF AND APPARATUS FOR DISTILLING A NONAZEOTROPIC LIQUID MIXTURE --

Signed and Sealed this

Seventeenth Day of November, 1987

Attest:

DONALD J. QUIGG

*Attesting Officer*  *Commissioner of Patents and Trademarks*